United States Patent [19]

Zulaski

[11] 4,346,307

[45] Aug. 24, 1982

[54] VOLTAGE-UNBALANCE DETECTOR FOR POLYPHASE ELECTRICAL SYSTEMS

[75] Inventor: John A. Zulaski, Mount Prospect, Ill.

[73] Assignee: S & C Electric Company, Chicago, Ill.

[21] Appl. No.: 957,267

[22] Filed: Nov. 3, 1978

[51] Int. Cl.³ .......................................... H01H 83/14
[52] U.S. Cl. .................................... 307/130; 361/86; 361/90
[58] Field of Search ....................... 307/130, 125, 126; 361/89, 90, 79, 86, 85, 92; 340/663

[56] References Cited

U.S. PATENT DOCUMENTS

| | | | |
|---|---|---|---|
| 2,234,235 | 3/1941 | Dubusc | 361/79 |
| 2,941,121 | 6/1960 | Gladnick et al. | 361/85 X |
| 3,636,541 | 1/1972 | Genuit et al. | 361/92 |
| 3,727,103 | 4/1973 | Finch et al. | 361/79 X |
| 3,838,314 | 9/1974 | Boothman et al. | 361/89 X |
| 4,002,976 | 1/1977 | Zulaski | 323/76 X |
| 4,060,843 | 11/1977 | Bost | 361/89 X |
| 4,091,433 | 5/1978 | Wilkinson | 361/86 X |

Primary Examiner—Michael L. Gellner
Assistant Examiner—James L. Dwyer
Attorney, Agent, or Firm—John D. Kaufmann

[57] ABSTRACT

A detector for high-voltage, polyphase gear, having a fuse-switch combination in each phase and a switch operator, includes voltage sensors which provide first time-varying signals indicative of the magnitude and phase orientation of the phase-to-ground voltages on each phase within the gear at the load side of the fuses. The first signals are vectorially added to provide a second time-varying signal, the peak value of which varies as the magnitude and phase orientation of the phase-to-ground voltages of the phases. The second signal is compared to a reference; an error signal is generated when and as long as the phase-to-ground voltages vary beyond set limits. A timer responds to the error signal and provides a third signal a predetermined time after initiation of the error signal, but only if the error signal persists for such time. The third signal is used to cause the operator to open the switches.

9 Claims, 4 Drawing Figures

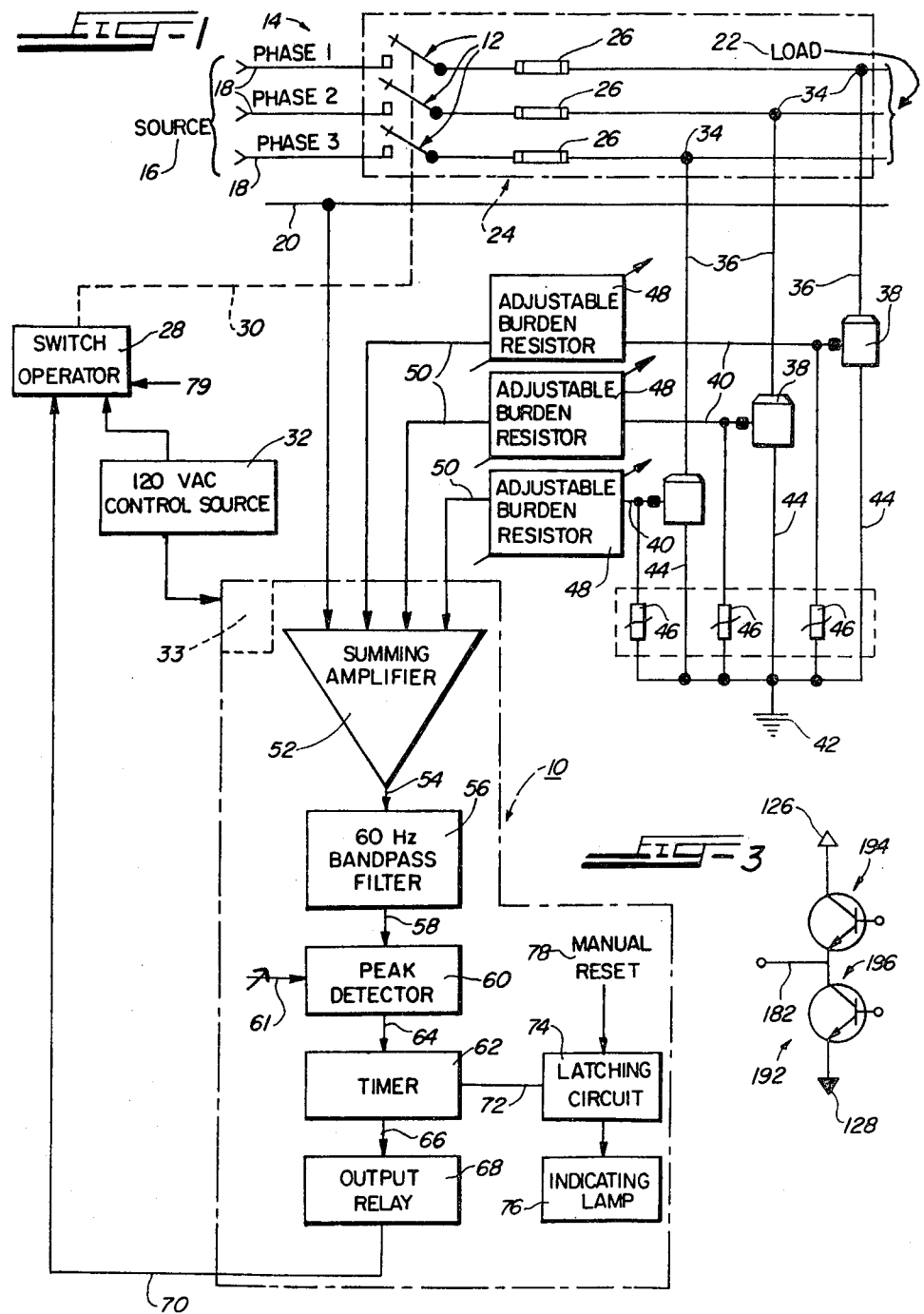

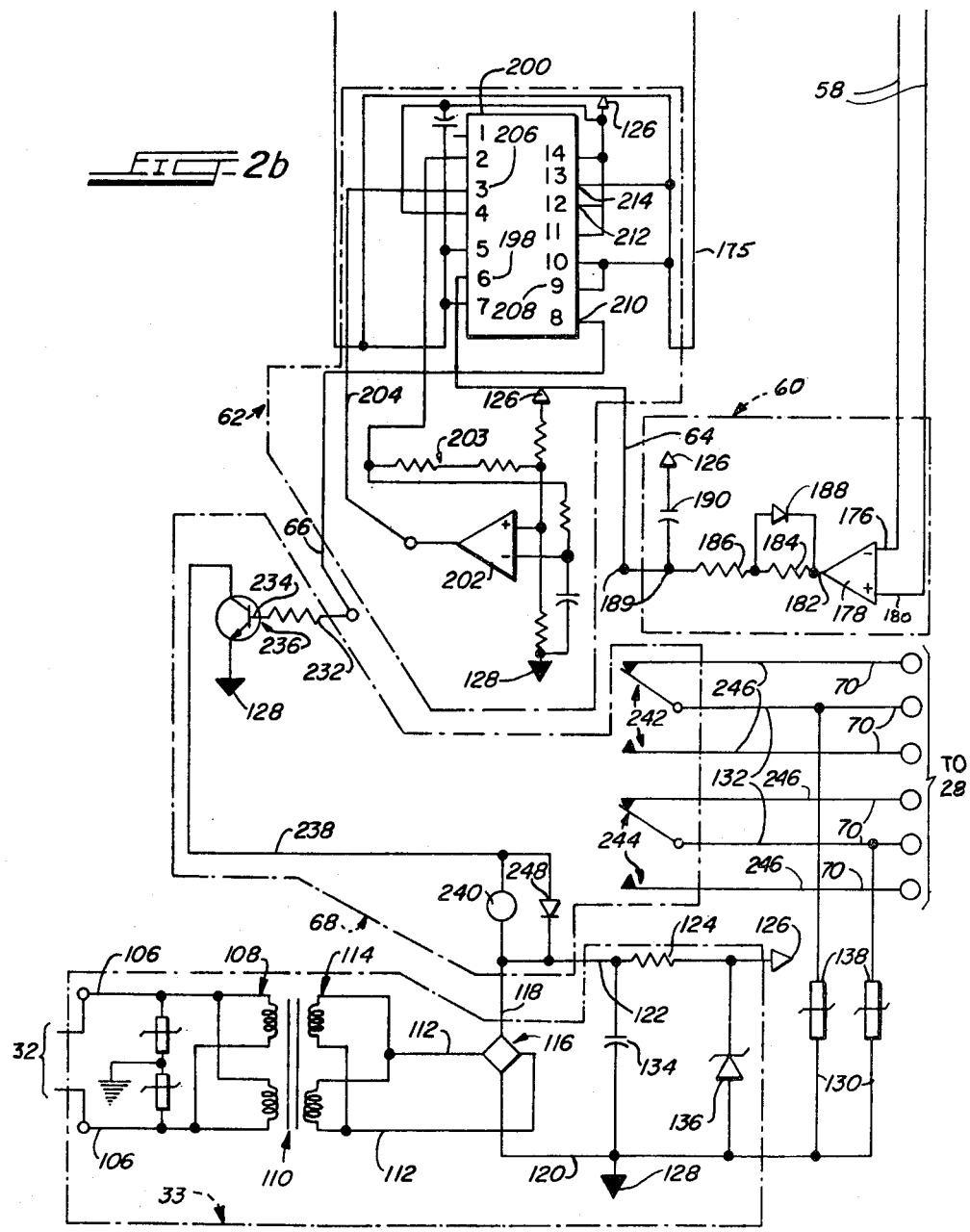

VOLTAGE-UNBALANCE DETECTOR FOR POLYPHASE ELECTRICAL SYSTEMS

BACKGROUND OF THE INVENTION

1. Field of the Invention

The present invention relates to an improved voltage-unbalance detector for electrical systems and more specifically, to an automatic detector usable with switchgear in polyphase electrical systems which detector responds to phase-to-ground over-voltages phase-to-ground under-voltages on one or more phases of the polyphase electrical system, as well as to improper phase orientations among the voltages on the phases of the polyphase electrical system.

2. Brief Description of the Prior Art

Numerous control systems and detectors for polyphase electrical systems and for equipment contained in such systems are well known. One type of equipment often used or found in polyphase electrical systems is metal-enclosed switchgear which usually contains a series combination, for each phase of the system, of an interrupter switch and a power fuse. An interrupter switch is an electrical switch which may be manually or automatically operated (opened or closed) as dictated by the requirements of the system or by requirements of loads connected thereto. An interrupter switch has the capability of opening a phase in which it is contained and, upon such opening, interrupting load currents and currents of lesser magnitude flowing in the phase. Such interruption normally includes the extinguishment or suppression of a high-voltage arc which forms when opening of the phase is attempted. The arc is extinguished or suppressed in a controlled environment so as to cause little if any distress to the switch itself, to the metal-enclosed switchgear in which this switch is contained, or to the electrical system to which the switchgear is connected.

The power fuses serially connected to each interrupter switch are essentially protective devices. Specifically, these power fuses respond to fault currents or other over-currents flowing in the phase in which they are connected and interrupt such fault currents or other over-currents upon the occurrence thereof. Interruption effected by the power fuses involves the extinguishment or suppression of the high-voltage arc which is formed incident thereto in a controlled environment so as to cause little if any distress to the electrical system or to other equipment connected thereto.

Under certain conditions, including single phase-to-ground faults, only one power fuse in one of the phases of the metal-enclosed switchgear may operate. The operation of one such fuse does not effect current flow in the other phases to which the metal-enclosed switchgear is connected. Accordingly, polyphase loads connected to the output of the metal-enclosed switchgear may either not perform optimally or may be ultimately damaged by a condition known as single-phasing, as is well known. To date, the art has lacked a convenient, inexpensive and reliable detector or control system for sensing such single-phasing and for operating the metal-enclosed switchgear in response thereto to prevent damage to the polyphase loads. Additionally, to date, the art has not known a convenient, inexpensive and reliable detector or control system for responding to over-voltages or under-voltages in some but less than all phases of polyphase electrical systems and for appropriately thereafter operating the metal-enclosed switchgear to prevent damage to the electrical system or to those connected thereto. Lastly, to date, the art has not known a detector or control system which is convenient to use and inexpensive to manufacture and reliable, and which can efficiently respond to improper phase orientations among the voltages on the phase of the polyphase electrical system.

The provision of a detector or control system as generally described above is a primary object of the present invention.

SUMMARY OF THE INVENTION

With the above and other objects in view, the present invention relates to an improved detector for use with high-voltage polyphase switchgear. The switchgear is of the type which includes a series combination of an interrupter switch and a power fuse in each phase thereof. Also included is a switch operator for opening the switches. The switchgear is connectable between a source and loads of high-voltage, polyphase, alternating current electrical system.

In its broadest perspective, the improved detector of the present invention includes sensors for providing a first time-varying output signal which is proportional to the phase-to-ground voltage on each phase of the system. The first output signal is vectorially summed by a summer which provides a second time-varying output signal. The peak value of the second output signal varies according to variations in the phase orientation and magnitude of the phase-to-ground voltages on each phase of the system. A comparator compares the second output signal to a reference signal and provides an error signal if, and as long as, the phase-to-ground voltage variations exceed predetermined limits. A timer is responsive to the error signal for providing a third output signal a predetermined time after initiation of the error signal, but only if the error signal persists for such predetermined time. The third output signal is effective to initiate operation of the switch operator to open the switches.

In a preferred embodiment a filter is provided for removing unwanted harmonics from the second output signal. Also, the comparator may be constituted so as to provide the error signal even though the phase-to-ground voltage variations momentarily cease to exceed the predetermined limits for a short time which is substantially less than the predetermined time following the initiation of the error signal, which was provided because the phase-to-ground voltage variations exceeded predetermined limits.

BRIEF DESCRIPTION OF THE DRAWING

FIG. 1 is a block diagram of a voltage unbalance detector for polyphase electrical systems according to the principles of the present invention;

FIGS. 2a and 2b is an electrical schematic diagram depicting in greater detail various elements of the block diagram of FIG. 1; and FIG. 3 is an schematic depiction of a portion of FIGS. 1 and 2.

DETAILED DESCRIPTION

Figure 2A:
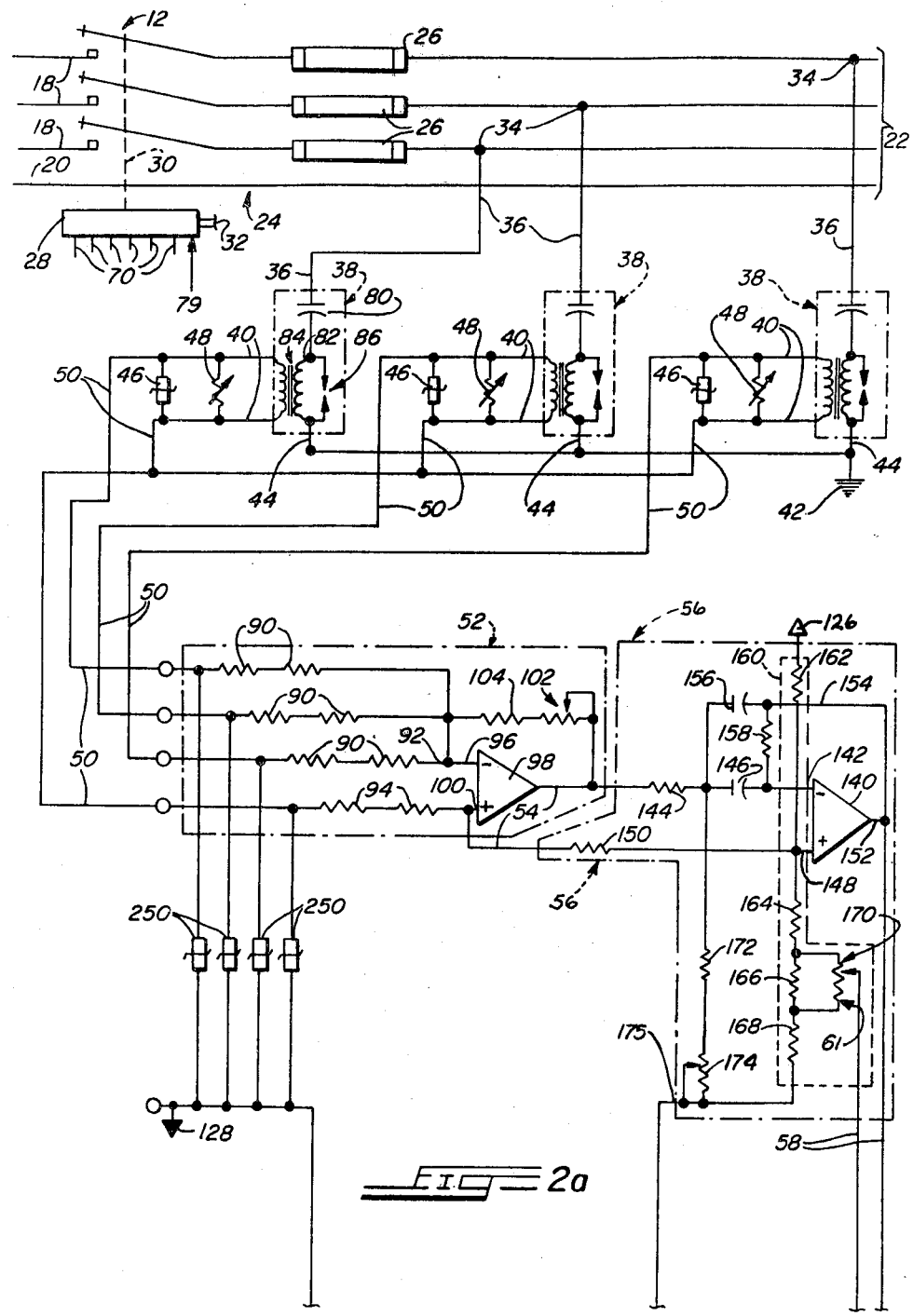

Referring first to FIG. 1, the present invention relates to a voltage-unbalance detector 10 which effects selective operation of switches 12 in a polyphase high-voltage electric circuit 14 depending upon the condition thereof.

The circuit 14 includes a source of electrical power, not shown but indicated at 16, the source 16 being connected to three-phase conductors 18 comprising the circuit 14. The circuit 14 may also include a neutral conductor 20. Connected to the circuit 14 may be one or more loads, not shown but indicated at 22, which receive electrical power from the source 16 via the conductors 18. Connected between the source 16 and the loads 22 may be appropriate high-voltage switchgear, generally indicated at 24, which may, as is well known, include a metal enclosure or cabinet (not shown) surrounding or enclosing the switches 12 and other elements constituting the switchgear 24. Such other elements may include high-voltage fuses 26 protecting the circuit 14 from fault currents or other overcurrents. As will be hereinafter described, certain portions of the voltage-unbalance detector 10 of the present invention, as well as associated equipments, may also be enclosed within the enclosure or cabinet (not shown) which forms a portion of the switchgear 24. Preferably, the switches 12 are interrupter switches which have the ability to open the circuit 14 and interrupt current flow in the conductors 18 when the loads 22 are receiving electrical power. The switches 12, which are normally closed, may be selectively opened by a switch operator 28 of any convenient configuration. An appropriate mechanical connection between the switch operator 28 and the switches 12 is indicated by the dashed line 30. The switch operator 28 may be of any known type and may include appropriate motors, relays, transmissions, drive members, and the like, for effecting opening of the switches 12. The switch operator 28 may be powered by a source of voltage 32 which may have a lower voltage, such as 120 or 240 volts, than is present on the conductors 18. The voltage source 32 may, if desired, obtain electrical power from one or more of the conductors 18 and, after appropriate step-down transformation, apply voltage to the switch operator 28 to effect opening of the switches 12. It is preferred, however, that the voltage source 32 be independent of the conductors 18 so that the switch operator 28 is operational regardless of the condition of the circuit 14. As hereinafter more fully described, operation of the switch operator 28 is triggered or permitted by appropriate operation of the voltage-unbalance detector 10 of the present invention. The voltage source 32 may also supply electrical power to a power supply 33 of the voltage-unbalance detector 10 of the present invention in a manner to be hereinafter described.

For convenience, the side of the fuses 26 closer to the switches 12 is referred to as the source side, while the side of the fuses 26 closer to the loads 22 is referred to as the load side.

Conditions may arise in the circuit 14 leading to the blowing or operation of less than all of the high-voltage fuses 26. Should this condition occur, three-phase loads 22 may not perform optimally or may be ultimately damaged by a condition known as single phasing, as is well known. Moreover, other conditions, such as ferroresonance, in the circuit 14 may occur which are otherwise unsuitable from the standpoint of the loads 22. Specifically, damage to the loads 22 may be experienced if one or two of the phase conductors 18 experience either an over-voltage or an under-voltage.

The voltage-unbalance detector 10, according to the present invention, is intended to effect operation of the switch operator 28 to open the normally closed switches 12 in the event that any substantial voltage unbalance between the phase conductors 18 occurs at the load side of the fuses 27, thus protecting not only the integrity of the circuit 14 but also the loads 22. Voltage unbalance means that either the difference between the voltage magnitudes on the conductor 18 exceeds acceptable limits, or the phase orientation of the voltages on the conductors 18 is improper.

Each conductor 18 includes an appropriate tap point 34, the tap points 34 being preferably located within the switchgear 24 on the load side of the fuses 26. Connected to the respective tap points 34 by respective conductors 36 are voltage-sensing devices 38, more completely described in commonly assigned U.S. Pat. No. 4,002,976 to Zulaski. The voltage-sensing devices 38 provide a low-voltage output which is proportional to, and which may be used to determine the magnitude and relative phase orientation of, the phase-to-ground voltages on the conductors 18. The device 38 are essentially constant-current devices, the output current thereof on respective outputs 40 being directly proportional to the voltage with respect to the neutral 20 at the tap points 34 of the conductors 18. The devices 38 are connected to ground 42 by conductors 44. If desired, connected between the outputs 40 and the ground 42 may be over-voltage protection devices, such as the varistors 46 depicted. The varistors 46 prevent damage to loads connected to the outputs 40, as well as to the devices 38 themselves, in the event of an inadvertent loss of burden on the outputs 40 or due to the inadvertent application of continuous conductor-to-conductor 18-to-18 voltage to the conductors 36.

The outputs 40 are connected to the voltage-unbalance detector 10 through adjustable burden resistors 48. Because of the nature of the devices 38 and of the output present on their outputs 40, the burden resistors 48 are adjustable so that, if no voltage unbalance between the phase conductors 18 exists, outputs 50 of each resistor 48 are all equal. The magnitude and phase orientation of signals present on the outputs 50 vary as the magnitude and phase orientation of the voltages on the conductors 18 vary.

The voltage-unbalance detector 10 includes a summing amplifier 52 to which all of the outputs 50 are fed. The summing amplifier 52 vectorially sums the signals present on the outputs 50 and produces a time-varying signal on an output 54 that is proportional to the degree of voltage unbalance between the phase conductors 18. The signal on the output 54 is a 60-hertz signal, the peak value of which is related to the degree of unbalance between the voltages of the phase conductors 18. The signal on the output 54 may also include various harmonics. Accordingly, signals present on the output 54 are fed to a 60-Hz. band-pass filter 56 which substantially eliminates all harmonics. Signals on an output 58 of the band-pass filter 56 are, therefore, 60-Hz. signals free of any harmonics, the peak values of which are indicative of the degree of unbalance between the voltages on the phase conductors 18.

As should be apparent, the signals present on the outputs 50 will be time-varying signals which may be represented, relative to the three-phase circuit 14 depicted, by three equal-length vectors drawn from a common point and 120 electrical degrees apart. As long as the vectors are of equal length (indicating that the voltage magnitudes on the conductors 18 are equal) and are equally spaced (indicating that the phase orientation of each voltage on the conductors 18 is proper), the vector sum of the signals on the outputs 50 is zero. The signal on the output 54 of the summing amplifier 52 is also zero. If the vectors are (a) of unequal length, or, (b) unequally spaced, or, (c) both, the signal on the output 54 has a time-varying non-zero value, the magnitude of which increases as (a) or (b) increase. Condition (a) may occur, for example, during the time ferroresonance conditions exist between the source 16 and the switchgear 24 which conditions may cause the voltages on the conductors to have unequal magnitudes. Condition (b) may occur, for example, should two phases of a delta-connected transformer located between the source 16 and the switchgear 24 become de-energized. Condition (c) may occur should one or two of the power fuses 26 operate.

Signals on the output 58 are fed to a peak-level detector or comparator 60. The peak-level detector 60 compares the peak values of the 60-Hz. signals present on the output 58 to an adjustable dc reference 61. The peak-level detector 60 has its output 64 connected to a timer 62. Normally, signals on the output 64 are "high" or at some positive value inhibiting, or preventing operation of, the timer 62. Should the peak-level detector 60 determine that the peak values of the signals present on the output 58 exceed the reference dc level, signals present on the output 64 of the peak detector 60 change to a "low" value, initiating operation of the timer 62. Should the signals present on the output conductor 64 remain low for an adjustable pre-determined period of time, the timer 62, via a signal on an output 66, effects operation of an output relay 68. Should the signal on the output 64 return to a high state, indicating that the unbalanced condition among the voltages on the phase conductors 18 has been eliminated, before the passage of the predetermined time, operation of the timer 62 is again inhibited and the output relay 68 is not operated thereby. However, should the signal on the output 64 return only momentarily to a high state, followed shortly by a return to the low state, the timer 62 remains activated (not inhibited) and operates the output relay 68 at the end of the predetermined time period, measured from the time of the initial dropping of the signal on the output 64 to a low state. In effect, the peak-level detector 60 "ignores" momentary alleviations of unbalance conditions among the voltages on the conductors 18.

The output relay 68 is connected by a output 70 to the switch operator 28. Operation of the output relay 68 by the timer 62 effects the transmission of a signal by the relay 68 along the output 70 to the switch operator 28 to effect opening of the normally closed switches 12. Also connected to the timer 62 by a conductor 72 may be a magnetic latching relay 74 and an indicating lamp 76 or other indicator. Should the timer 62 operate the output relay 68, there is also caused the illumination of the indicating lamp 76, which illumination is maintained by the latching relay 74 unless the latter is manually reset as indicated at 78. Thus, should a sufficiently great voltage unbalance on the phase conductors 18 occur for sufficient length of time to cause opening of the switches 12 therein by the switch operator 28 under the influence of the voltage-unbalance detector 10, the latching relay 74 remains "picked up" regardless of what happens thereafter. Accordingly, a human operator attempting to determine the condition of the switchgear 24, and specifically of the switches 12, receives a visual indication from the illumination of the lamp 76 that a switch opening operation has occurred. When the human operator recloses the switches 12 by manual operation as indicated at 79, or by other appropriate operation of the switch operator 28 following correction of the problem which led to the voltage unbalance in the first place, he also manually resets at 78 the latching relay 74 to turn the lamp 76 off until the voltage-unbalance detector 10 operates again.

As may be appreciated, the voltage-unbalance detector 10 may cause opening of the switches 12 due to any upstream condition—that is, between the tap points 34 and the source 16—which causes unbalance between the phase conductors 18. Such conditions include so-called single-phasing caused by the blowing of less than all of the fuses 26, the opening of less than 11 of the conductors 18, or the closing or opening of switches in less than all of the conductors 18.

The timer 62 permits the user of the switchgear 24 to select the amount of time the voltage unbalance on the conductors 18 must be present before opening of the switches 12 occurs. Typically, the time selected will be one which, considering various system and circuit parameters, indicates that the unbalanced condition on the conductors 18 is permanent and not transient. Further, the timer 62 may be adjustable to permit voltage unbalances on the conductors 18 to persist for pre-determined lengths of time in order to provide coordination with other protective devices (not shown) in the circuit.

The peak detector 60 also includes a voltage-unbalance level adjust (not shown in FIG. 1) which allows adjustment over a predetermined range of the amount of voltage unbalance on the conductors 18 which must be present before operation of the timer 62 is initiated. The ability of the peak detector 60 to be adjusted so that it may effect operation of the timer 62 over a range of permissible unbalance settings permits the user to prevent the detector 10 from being overly sensitive. Oversensitivity of the detector 10 could lead to so-called nuisance tripping, that is, unnecessary openings of the normally closed switches 12 due to non-permanent voltage unbalance on the phase conductors 18.

It should be noted that in place of the devices 38 there may be used voltage transformers or other suitable voltage-sensing devices which provide an appropriate output to the summing amplifier 52 proportional to the voltage on the phase conductors 18. Further, the devices 38, or equivalent devices, are sensitive only to the voltage on the phase conductors 18. This permits unbalance in load currents flowing through the phase conductors 18 to be ignored and to not cause an undesirable opening of the switches 12.

Turning now to FIG. 2, there is shown a specific preferred embodiment according to the present invention. The same reference numerals have been used in FIG. 2 to identify similar elements already identified in FIG. 1.

As more fully explained in U.S. Pat. No. 4,002,976, each voltage-sensing device 38 includes a capacitor 80, one side of which is connected to a phase conductor 18 at the tap point 34 and the other side of which is connected to one side of a primary 82 of an iron-core step-down transformer 84 which may have a turns ratio of 20:1. The other side of the primary 82 is connected to the conductor 44, which is ultimately connected to the ground 42. A spark gap 86 is paralleled with the primary 82. A secondary 88 of the transformer 84 has output terminals each bearing the reference numeral 40. The adjustable burden resistors 48 are respectively connected across the output terminals 40, as is the varistor 46. The outputs 50 are a pair of conductors also connected across the burden resistor 48 which form continuations of the output terminals 40.

The ac voltage on the phase conductors 18 causes current to flow through the capacitors 80 and the primary 82 of the transformer 84 to ground 42. The capacitors 80 and the primary 82 represent a relatively high impedance load, thus limiting the magnitude of the current flow. The alternating current flowing through the primary 82 induces a corresponding current in the secondary 88. Due to the step down nature of the transformer 82 (in this case, an exemplary 20:1), there is substantial step down of voltage available between the output terminals 40 and, of course, a corresponding high current. The connection of the burden resistors 48 across the output terminals 40 makes available an output voltage across such resistors 48. This output voltage is directly proportional to and representative of the voltage on the phase conductors 18, and can be calibrated by adjustment of the burden resistors 48. If the output terminals 40 or the output conductors 50 are short circuited, the devices 38 are not damaged inasmuch as the capacitors 80 are designed to continuously withstand the full line-to-ground voltage. Moreover, as explained above, should the burden resistors 48 become opened, the varistors 46 protect both the devices 38 and loads connected thereto, namely, the resistors 48 and the high-voltage unbalance detector 10 of the present invention. Signals present on the output conductors 50 from each device 38 are thereafter fed to the summing amplifier 52.

One of each pair of output conductors 50 is connected to a pair of serially connected resistors 90 forming a part of the summing amplifier 52. The other end of the resistors 90 is connected to a common junction 92. The other output conductor 50 of each pair thereof is connected to a common conductor 50 which is connected to one side of a pair of serially connected resistors 94. The common junction 92 is connected to the inverting input 96 of an operational amplifier 98. The other end of the resistor pair 94 is connected to the non-inverting input 100 of of the operational amplifier 98. With these connections, there will be present across the conductors 54, between which the output of the operational amplifier 98 is taken, a time-varying signal, the peak value of which is proportional to the amount of unbalance between the phase-to-neutral (or phase-to-ground) voltages on the phase conductors 18. That is to say, if little or no unbalance between the phase-to-neutral voltages on the phase conductors 18 is present, the signal measured between the conductors 54 due to operation of the operational amplifier 98 will be zero or low. On the other hand, the signal between the conductors 54 increases as the amount of unbalance between the phase-to-neutral voltages on the phase conductors 18 increases.

One of the output conductors 54 also has connected thereto a potentiometer 102 connected to the common junction 92 through a resistor 104. As is well-known, this connection of the potentiometer 102 and the resistor 104 provides an adjustment of the gain of the summing amplifier 52.

The power supply 33 includes a pair of input leads 106 which are connected to the independent source 32 of low voltage. The input leads 106 are connected to the primary 108 of a transformer 110, the primary 108 having the parallel configuration shown when the source 32 is 120 volts ac; the primary 108 may be connected in series if the source 32 is 240 volts ac, as is well-known.

Voltage signals applied to the input leads 106 induce a voltage on output leads 112 connected to a secondary 114 of the transformer 110 which may be parallel- or series-connected similar to the primary 108. AC signals appearing on the output leads 112 are applied to a full-wave bridge rectifier, generally indicated at 116, which provides a dc signal between output leads 118 and 120 thereof. The dc signal on the output lead 118 is transmitted to the output relay circuit 68, as described below. Such dc signal on the output lead 118 is also applied via a conductor 122 and a series resistor 124 to a voltage pick-off point 126 at which may be derived a positive dc voltage with respect to ground, such as +10 volts. The output lead 120 is connected both to a circuit ground 128 and to a pair of conductors 130, which are therefore grounded. The conductors 130 are respectively connected to a pair of conductors 132 which constitute a pair of the output of the output relay circuit 68, as described below.

Connected between the conductor 122 and the output lead 120 is a capacitor 134 which removes ripple from the dc signal across the output leads 118 and 120. Aslo connected between the resistor 124 and the output lead 120 is a zener diode 136 which serves to regulate the voltage available at the voltage pickoff point 126 to its selected value, here approximately +10 volts. The conductors 130 may be connected to the conductors 132 via a pair of similar varistors 138. These varistors 138 serve the function of protecting the output of the output relay circuit 68 in the event that undesirable voltage surges appear on the conductors 132. Should such voltage surges appear, the varistors 138 conduct the surges to the system ground 128.

The 60-Hz. band-pass filter 56 includes an operational amplifier 140. Signals on the output 54 from the operational amplifier 98 are connected to the inverting input 142 of the operational amplifier 140 through a series-connected resistor 144 and capacitor 146. The non-inverting input 148 of the operational amplifier 140 is connected to the other conductor 54 through a resistor 150. A feedback circuit from the output 152 of the operational amplifier 140 is provided by a conductor 154 connected between such output 152 and a point between the resistor 144 and the capacitor 146 via a capacitor 156. The feedback circuit also includes a resistor 158 between the output 152 and the inverting input 142, both of the operational amplifier 140.

Included in the band-pass filter 56 is a voltage-divider network 160. The voltage-divider network 160 includes the voltage pickoff point 126, which is connected through a resistor 162 to the non-inverting input 148 of the operational amplifier 140. Also connected to this non-inverting input 148 are three series connected resistors 164, 166 and 168. The resistor 166 is paralled with a potentiometer 170. The output tap of the potentiometer 170 and the output 152 of the operational amplifier 140 constitute the input 58 of the peak-level detector 60.

Also connected to a point between the resistor 144 and the capacitor 146 are a resistor 172 and a potentiometer 174. The potentiometer 174 is connected as shown to a conductor 175, which is connected to the circuit ground 128. The potentiometer 174 is adjusted to ensure a 180° phase shift between the input and output of the band-pass filter 56.

The operation of the band-pass filter 56 is best explained with reference to the design equations therefor. These equations need not be explained here, and they and a functional description of the filter 56 may be found in *Operational Amplifier Design and Applications,* by various authors and editors who are employees of Burr-Brown Research Corp., published by McGraw-Hill Book Company, copyrighted in 1971, especially Chapter 8 thereof entitled "Active Filters," and more especially at p. 291.

The voltage divider 160 is connected between the regulated voltage available at the pick-off point 126 and the circuit ground 128 (via the conductor 175). The divider 160 is such that a voltage of about four-volts dc is established at the non-inverting input 148 of the operational amplifier 140. The purpose of this four-volts dc is to provide a dc bias for the 60-Hz. signal fed to the operational amplifier 140 so that negative portions of this signal are not clipped.

The dc reference 61 on the output conductor 58 running from the potentiometer 170 is fed to the inverting input 176 of an operational amplifier 178 forming a portion of the peak detector 60. The potentiometer 170 is adjustable to establish a voltage at this input 176 of 1.25-3 volts dc. The other output conductor 58 runs from the output 152 of the operational amplifier 140 to the non-inverting input 180 of the operational amplifier 178. The output 182 of the operational amplifier 178 is connected to a pair of series resistors 184 and 186. The resistor 184 is paralleled with a diode 188 which is back-biased with reference to the output 182 of the operational amplifier 178. The resistor 186 is connected to both the output conductor 64 of the peak detector 60 and, via a node 189, through a capacitor 190 to the voltage pickoff point 126. As long as the voltage unbalance between the voltages on the phase conductors 18 remains zero or low, the output 182 of the operational amplifier 178, acting as a comparator as is well-known, remains high. Because the capacitor 190 has a high signal applied to both sides thereof (by the output 182 and by the voltage pickoff point 126), this capacitor 190 remains uncharged, and the node 189 and the conductor 64 are in a high state. When the voltage unbalance between the phase conductors 18 exceeds a pre-determined level as determined by the adjustment of the potentiometer 170, the output 182 goes low, permitting the capacitor 190 to charge to ground and permitting the node 189 and the output conductor 64 to eventually go low.

Specifically, when the signal on the output 182 is high (indicating little, if any, phase-to-neutral unbalance of the voltages on the phase conductors 18), it is equal, or close to the voltage at the pick-off point 126. Thus, the capacitor 190 has a low or no charge, and the voltage at the node 189 is close to, or at, the +10 volts dc present at the pick-off point 126. When the signal on the output 182 is low (indicating phase-to-neutral unbalance of the voltages on the phase conductors 18 above a predetermined level), the capacitor charges to ground, via a ground connection to be described below with reference to FIG. 3, and momentarily appears as a short circuit. This causes the entire voltage from the pick-off point 126 to momentarily appear across the resistor 186 to forward bias the diode 188. As the capacitor charges via the ground connection and the resistor-diode 186-188, the voltage across the resistor 186 decays quite rapidly, ultimately going low as does the node 189. Should the signal on the output 182 again go high the capacitor 190 becomes again uncharged via the resistors 184 and 186, the diode 188 now being backbiased. The relative values of the resistors 184 and 186 are selected so that the return of the capacitor 190 to the uncharged state, and the accompanying return of the node 189 to a high state, requires more time than does the charging of the capacitor 190, and the accompanying drop of the node 189 to the low state. Thus, the voltage at the node 189 goes from high to low (in response to an unacceptable voltage unbalance among the phase conductors 18) much more rapidly than it goes from low to high (in response to the cessation of a former unacceptable voltage unbalance).

As will be seen, when the node 189 goes from high to low and remains low for a predetermined time, the timer 62 and the output relay 68 cause opening of the switches 12. Also, when the node is low and then goes high before passage of the predetermined time, the timer 62 and the output relay 68 are prevented from opening the switches 12. The fact that the node 189 goes high-to-low more rapidly than it goes low-to-high causes the timer 62 to "ignore" for some time the return of the voltage states of the phase conductors 18 to acceptable values. Thus, if the return to acceptable values is only momentary or transient, and is followed by an unacceptable voltage unbalance on the phase conductors 18, the predetermined time continues to run and ultimately the switches 12 are opened. Contrariwise, if the return to acceptable values is long-lived and the capacitor 190 returns to its uncharged state prior to the running of that portion of the predetermined time left after the output 182 again went high, the switches 12 are not opened. Accordingly, it is more accurate to say that if the node 189 goes from high to low and does not again go high before the passage of the predetermined time, the switches 12 are opened. Also, if the node 189 goes from low to high, it must reach the high state before the passage of the predetermined time, measured from the time the node 189 first went low.

The above-described operation of the peak-level detector 60 depends upon operation of the operational amplifier 178 as a voltage comparator which generates an error signal (high or low) on the output 182, depending upon the amount of voltage unbalance between the phase conductors 18. As previously described, the signal present on the non-inverting input 180 of the operational amplifier 178 is proportional to the amount of phase-to-neutral voltage unbalance between the phase conductors 18. The dc reference 61 present on the inverting input 176 of the operational amplifier 178 from the potentiometer 170 is adjustable; the signal on the non-inverting input 180 is compared to the dc reference 61. The predetermined level at which the output 182 of the operational amplifier 178 goes low is determined by appropriate adjustment of the potentiometer 170.

Turning now to FIG. 3, there is shown a circuit 192 which is found in the final output stage of the operational amplifier 178, as is well-known. The circuit 192 comprises two similar transistors 194 and 196, which are complementarily driven. That is, when the transistor 194 is "on" the transistor 196 is "off," and vice versa. In the normal state of affairs, when there is little or no voltage unbalance between the voltages on the phase conductors 18, the transistor 194 is "on" and the transistor 196 is "off." With the transistor 194 "on", the positive voltage from the voltage pickoff point 126 is supplied through the collector thereof to the emitter and from there to the output 182, where such positive signal is applied through the resistors 184 and 186 to one side of the capacitor 190 and to the node 189. Should a signal occur on the input 180 of the operational amplifier 178 which indicates that the voltage unbalance between the phase conductors 18 exceeds predetermined levels, the transistor 194 is turned "off" and the transistor 196 is turned "on". In this state of affairs, the output 182 is connected through the collector and the emitter of the transistor 196 to the system ground 128. Thus, the capacitor 190 is charged to the system ground 128 through the output conductor 182 of the operational amplifier 178 following which the node 189 goes low. This charging of the capacitor 190 takes place along a path which includes the resistor 186 and the diode 188, which is now forward biased by the voltage across the resistor 186. Signals on the output conductor 64 of the peak-level detector 60 from the node 189 are supplied to an input 198 of an integrated circuit timer 200 found in the timer 62. The presence of a high signal inhibits operation of the timer 200. When the signal on the output conductor 64 of the peak-level detector 60 goes low, the inhibiting signal is removed from the input 198, permitting the timer 200 to begin a count.

The timer 62 includes an operational amplifier 202 externally connected to form an RC oscillator 203 which provides, on an output 204 of the operational amplifier 202, clock signals or pulses to an input 206 of the timer 200. These clock signals provide a time base for the timer 200 which, however, is unable to utilize such time base until the inhibiting signal normally present at the input 198 is removed due to the output conductor 64 going low.

The timer 200 is more fully described at pages 5-385 through 5-390 of the *Semiconductor Data Library CMOS*, volume 5/Series B published by Motorola, Inc., any copyrighted in 1976. The timer 200 has an item number of MC14541B, although other timers may be used. The pin numbers found in the block diagrams on pages 5-385 and 5-389 have been retained in FIG. 2 and in parentheses herein. MC14541B includes an internal oscillator (not shown) which may be bypassed by connection of an external clock, such as the RC oscillator 203, to an Rs pin (3), here identified by the reference numeral 206. When a Q/$\overline{Q}$ select pin (9) 208 is set to "0", the timer 200 operates as follows. When a master reset pin (6), the input 198, receives a positive pulse, internal counters and a latch of the timer 200 are reset. Following termination of the positive pulse a Q output (8), labelled 210, goes low and remains low until a selected number of clock pulses applied to the Rs pin 206 are counted, at which time the Q output 210 goes high until the master reset 198 receives another positive pulse. The number of clock pulses counted depends on the signals, "0" or "1", applied to A&B pins (12 and 13) 212 and 214. In FIG. 2, the A and B pins 212 and 214 have respectively applied thereto a "1" (form the pick-off point 126) and a "0" (via the conductor 174 and the circuit ground 128), which renders the timer 200 a "256" counter. Thus, the timer 200 will count 256 pulses on the output 204 of the operational amplifier 202 in a time determined by the RC time constant of the RC oscillator 203.

As long as there is no undesirable unbalance among the phase conductors 18, the node 189, the conductor 64 and the master reset 198 remain high. In this condition the internal counters and latch of the timer 200 are reset and the Q output 210 is low. Clock pulses applied to the R$_s$ pin 206 are not counted by the timer 200. When the node 189 goes low, the high state of the master reset 198 terminates; this is analogous to termination of a positive pulse. Accordingly, the timer 200 is now able to count the clock pulses on the output 204. If the node 189 goes high before 256 of the clock pulses have been counted, counting teminates and the timer 200 is reset. If the node 189 stays low for the predetermined time it takes to count 256 clock pulses, the Q output 210 goes high.

If the voltage unbalance between the phase conductors 18 returns to tolerable levels prior to generation by the timers 200 of a signal on the output 210, the signal on the output conductor 64 of the peak detector 60 again goes high. This high signal is applied to the input 198 of the timer 200 inhibiting its further operation and preventing the presence of the signal on the output 210. Should the voltage unbalance between the phase conductors 18 persist for more than the predetermined time, the signal present on the output 210 thereof is fed along the output conductor 66 of the timer 62 and through a resistor 232 to the base 234 of a transistor switch 236. The transistor switch 236 and the resistor 232 form a part of the output relay circuit 68.

The emitter of the transistor 236 is grounded at the circuit ground 128. Its collector is connected via a conductor 238 to a relay coil 240. The relay coil 240 is connected to the bridge rectifier 116 by the conductor 118. Thus, when the transistor 236 if "off", the relay coil 240 is de-energized. Should a high signal on the base 234 of the resistor 236 be present, the transistor turns "on" providing a path to ground for the signal present on the conductor 118 through the relay coil 240. This energizes the relay coil 240 to selectively operate contacts 242 and 244 thereof. The contacts 242 and 244 are connected to the conductors 132 and conductors 246, all of which conductors 132 and 246 constitute and are continuous with the conductors 70, which are in turn connected to the switch operator 28. Appropriate operation of the contacts 242 and 244 effects operation of the switch operator 28 in a predetermined manner, as is well-known to those skilled in the art. The relay coil may be paralleled by a diode 248 which regulates the signal present at the conductor 118.

The relay, that is the coil 240 and the contacts 242 and 244 thereof, may take any convenient configuration depending, for example, on the nature of the switch operator 28 and the manner of energizing it to operate so that the switches 12 are closed. The contacts 242 or 244 may complete a energization circuit for the lamp 76 (not shown in FIG. 2) and the latching circuit 74, or the relay 240,242, 242 may itself be a magnetic latching relay manually resettable as at 78 following opening of the switches 12.

Because the grounds 42 and 128 are not necessarily at the same potential at all times (e.g., during ground surges), the outputs 50 may be tied to the circuit ground 128 via surge protectors 250, which may be varistors.

What is claimed is:

1. An improved detector for use with high-voltage, polyphase switch-gear, the switch-gear being of the type which includes an interrupter-switch-power-fuse combination in each phase thereof and a switch operator for opening the switches, the switch-gear being connectable between a source and loads of a high-voltage, polyphase, alternating current, electrical system, wherein the improved detector comprises:

sensing means for providing a first time-varying output signal indicative of the magnitude and phase orientation of the phase-to-ground voltage on each phase of the system;

means for vectorially summing the first output signals and for providing a second time-varying output signal, the peak value of which varies according to variations in the phase orientation and magnitude of the phase-to-ground voltage on each phase of the system so that the peak value of the second output signal is zero if the vector sum of the phase-to-ground voltage is zero, and so that the peak value of the second output signal is non-zero if the vector sum of the phase-to-ground voltages is not zero;

means for comparing the peak value of the second output signal to a reference signal and for providing an error signal if the peak value of the second output signal is non-zero by more than a predetermined value, the error signal indicating that the phase-to-ground voltage variations exceed predetermined limits, the comparing means
  (a) providing the error signal upon the passage of a first time period which begins when the peak value of the second output signal is non-zero by more than the predetermined value, and
  (b) eliminating the error signal upon the passage of a second time period which begins when the peak value of the second output signal either is zero or is non-zero by less than the predetermined value,
  the first time period being substantially less than the second time period;

timer means responsive to the error signal for providing a third output signal a predetermined time after initiation of the error signal only if such error signal persists for such predetermined time; and means responsive to the third output signal for initiating the switch operator to operate the switches.

2. A detector as recited in claim 1, wherein the comparing means provides the error signal even though the phase-to-ground voltage variations momentarily cease to exceed the predetermined limits for a time following initiation of the error signal which is substantially less than the predetermined time which follows initiation of the error signal.

3. A detector as recited in claim 1 or 2, which further comprises
  means for filtering unwanted harmonics out of the second output signal.

4. A detector as recited in claim 1 or 2, wherein the sensing means respond to the phase-to-ground voltage at the load side of the power fuses.

5. A detector as recited in claim 2, wherein the comparing means comprises
  a capacitor, the first side of which is connected to a supply voltage,
  a resistive network for applying to the second side of the capacitor a voltage substantially equal to the supply voltage when the phase-to-ground voltage variations do not exceed the predetermined limits,
  diode means and ground means connected to the resistive network for
    (a) permitting the voltage on the second side of the capacitor to rapidly decay when the phase-to-ground voltage variations exceed the predetermined limits, and
    (b) permitting the voltage on the second side of the capacitor to approach the supply voltage more slowly than the decay thereof when the phase-to-ground voltage variations cease to exceed the predetermined limits.

6. A detector as recited in claim 5, wherein
the resistive network comprises
  first and second resistors serially connected at their first ends, the second end of the first resistor being connected to the second side of the capacitor;
the diode means comprises
  a diode in parallel with the second resistor so that its anode is connected between the resistors and its cathode is connected to the second end of the second resistor; and
the ground means comprises
  means for applying the supply voltage to the second end of the second resistor and to the cathode of the diode when the phase-to-ground variations do not exceed the predetermined limits, and
  means for applying ground to the second end of the second resistor and to the cathode of the diode when the phase-to-ground variations exceed the predetermined limits.

7. A detector as recited in claim 6, wherein the second resistor has a substantially higher value than the first resistor, so that the charging of the capacitor via the first resistor and the diode and the consequent decay of voltage at the second side of the capacitor when ground is applied to the second end of the second resistor and to the cathode of the diode occurs more rapidly than the discharging of the capacitor and the consequent approach toward the supply voltage, via the resistors, of the voltage at the second side of the capacitor when the supply voltage is applied to the second end of the second resistor and to the cathode of the diode.

8. A detector as recited in claim 7, wherein the timer means comprises
  a binary counter,
  a source of clock pulses connected to the counter, and
  means for inhibiting operation of the counter as long as the error signal is not present,
  the counter providing the third output signal when a predetermined numer of clock pulses have been counted following initiation of the error signal.

9. A detector as recited in claim 8, wherein the reference signal is an adjustable dc signal.

* * * * *